United States Patent
Chen (10) Patent No.: US 12,524,801 B2
(45) Date of Patent: Jan. 13, 2026

(54) INTERACTION METHOD, APPARATUS, AND DEVICE AND STORAGE MEDIUM FOR ARTICLE EXHIBITION

(71) Applicant: NETEASE (HANGZHOU) NETWORK CO., LTD., Zhejiang (CN)

(72) Inventor: Siqi Chen, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 195 days.

(21) Appl. No.: 18/280,143

(22) PCT Filed: Jun. 23, 2022

(86) PCT No.: PCT/CN2022/100830
§ 371 (c)(1),
(2) Date: Sep. 1, 2023

(87) PCT Pub. No.: WO2023/142356
PCT Pub. Date: Aug. 3, 2023

(65) Prior Publication Data
US 2024/0144336 A1    May 2, 2024

(30) Foreign Application Priority Data
Jan. 28, 2022    (CN) .......................... 202210105341.X (51) Int. Cl.
*G06Q 30/0601* (2023.01)
*G06F 3/0482* (2013.01)
(Continued)

(52) U.S. Cl.
CPC ....... *G06Q 30/0643* (2013.01); *G06F 3/0482* (2013.01); *G06F 3/0485* (2013.01); *G06F 3/0487* (2013.01)

(58) Field of Classification Search
CPC ....................... G06Q 30/0601-06444
See application file for complete search history.

(56) References Cited

U.S. PATENT DOCUMENTS 6,924,827 B1 * 8/2005 Gulati ................. G06F 16/9574
715/761
9,633,392 B2 * 4/2017 Negrillo .............. G06F 16/9032
(Continued)

FOREIGN PATENT DOCUMENTS

| CN | 110681157 A | 1/2020 |
| CN | 111427493 A | 7/2020 |

(Continued)

OTHER PUBLICATIONS

Charles-Eric Dessart, Vivian Genaro Motti, and Jean Vanderdonckt. 2011. Showing user interface adaptivity by animated transitions. In Proceedings of the 3rd ACM SIGCHI symposium on Engineering interactive computing systems (EICS '11). Association for Computing Machinery, New York, NY, USA, 95-104. (Year: 2011).*

(Continued)

*Primary Examiner* — William J Allen
(74) *Attorney, Agent, or Firm* — BCF LLP (57) ABSTRACT

Provided are interaction method, apparatus, and device for article exhibition and a storage medium. This method includes: displaying, on a graphical user interface provided by a terminal device, an article exhibition area of a preset size in an article exhibition interface, where the article exhibition interface is displayed on the graphical user interface, and the article exhibition area is configured to display a plurality of articles; in response to an article selecting operation input for the article exhibition area, determining, by the terminal device, a target article selected by the article selecting operation; and reducing a size of the article exhibition area in the article exhibition interface, and displaying an information exhibition area in the article exhibition (Continued)

interface, where the information exhibition area is configured to display first information on the target article.

17 Claims, 4 Drawing Sheets (51) Int. Cl.
*G06F 3/0485* (2022.01)
*G06F 3/0487* (2013.01)

(56) References Cited

U.S. PATENT DOCUMENTS

| | | | | |
|---|---|---|---|---|
| 10,529,008 | B1* | 1/2020 | Pritchard | G06Q 30/0641 |
| 11,127,321 | B2* | 9/2021 | Klein | G06F 3/04886 |
| 11,847,680 | B1* | 12/2023 | Victor | G06Q 30/0603 |
| 2005/0182693 | A1* | 8/2005 | Alivandi | G06Q 30/02 |
| | | | | 705/26.5 |
| 2011/0040539 | A1 | 2/2011 | Szymczyk et al. | |
| 2013/0227452 | A1* | 8/2013 | Kang | G06F 3/04842 |
| | | | | 715/765 |
| 2014/0040066 | A1* | 2/2014 | Fujioka | G06Q 30/0601 |
| | | | | 705/26.5 |
| 2014/0229342 | A1* | 8/2014 | Marlowe | G06Q 30/0643 |
| | | | | 705/27.2 |
| 2014/0229888 | A1* | 8/2014 | Ko | G06F 3/04842 |
| | | | | 715/783 |
| 2014/0229891 | A1* | 8/2014 | O'Byrne | G06F 9/451 |
| | | | | 715/790 |
| 2016/0179358 | A1* | 6/2016 | Ohki | G06F 3/04847 |
| | | | | 715/800 |
| 2017/0004568 | A1* | 1/2017 | Radner | G06F 3/04883 |
| 2017/0236196 | A1* | 8/2017 | Isaacson | G06Q 20/12 |
| | | | | 705/14.51 |
| 2020/0134320 | A1* | 4/2020 | Crossley | G06V 20/46 |
| 2020/0410575 | A1* | 12/2020 | Grantham | G06K 7/1443 |
| 2023/0393700 | A1* | 12/2023 | Louch | G09G 5/026 |

FOREIGN PATENT DOCUMENTS

| | | | |
|---|---|---|---|
| CN | 111701233 | A | 9/2020 |
| CN | 111815419 | A | 10/2020 |
| CN | 112156465 | A | 1/2021 |
| CN | 112569596 | A | 3/2021 |
| CN | 112843707 | A | 5/2021 |
| CN | 113077322 | A | 7/2021 |
| CN | 113413603 | A | 9/2021 |
| CN | 114470765 | A | 5/2022 |

OTHER PUBLICATIONS

International Search Report and Written Opinion with regard to PCT/CN2022/100830 mailed Oct. 13, 2022.
English Abstract for CN114470765 retrieved on Espacenet on Aug. 29, 2023.
English Abstract for CN112569596 retrieved on Espacenet on Aug. 29, 2023.
English Abstract for CN113413603 retrieved on Espacenet on Aug. 29, 2023.
English Abstract for CN111815419 retrieved on Espacenet on Aug. 29, 2023.
English Abstract for CN112156465 retrieved on Espacenet on Aug. 29, 2023.
English Abstract for CN112843707 retrieved on Espacenet on Aug. 29, 2023.
https://www.bilibili.com/video/BV1YR4y1u7m3/?spm_id_from=333.999.0.0&vd_source=2f6c4ec61dbb4ac3cf7dac01f9092068, Feb. 2, 2022, pdf 2 pages.
Office Action with regard to the CN Patent Application No. 202210105341.X issued Dec. 16, 2024.

* cited by examiner

INTERACTION METHOD, APPARATUS, AND DEVICE AND STORAGE MEDIUM FOR ARTICLE EXHIBITION

CROSS-REFERENCE TO RELATED APPLICATIONS

The present disclosure is a U.S. National Phase Application of PCT International Application No. PCT/CN2022/100830, filed on Jun. 23, 2022, which is based upon and claims priority to the Chinese patent application with the filing No. 202210105341.X filed with the China National Intellectual Property Administration on Jan. 28, 2022, and entitled "ARTICLE DISPLAY INTERACTION METHOD, APPARATUS, AND DEVICE AND STORAGE MEDIUM", the entire contents of both of which are hereby incorporated by reference for all purposes.

TECHNICAL FIELD

The present disclosure relates to the technical field of video games, in particular to an interaction method, an apparatus, and a device and a storage medium for article exhibition.

BACKGROUND

With continuous development of Internet technologies, development of e-commerce platforms or games is faster and faster, and when using the e-commerce platforms or playing games, users often need to browse and view a plurality of articles of a certain type or different types.

In the related art, when browsing articles, the users usually determine a certain type to be browsed and then enter an article exhibition interface of this type, and in a browsing process, after clicking on a certain target article object in the article exhibition interface, enter a detail display interface of this target article object. If the users wish to browse details of other articles, the users exit the detail display interface of this target article object, need to return to the previous browsing interface, and re-select an article object from a plurality of articles in the browsing interface for viewing.

However, such a browsing manner will interrupt the experience of browsing subsequent articles, and cannot meet the users' requirement for rapidly switching and browsing articles.

SUMMARY

A first aspect of the present disclosure provides an interaction method for article exhibition, where a graphical user interface is provided by a terminal device, and an article exhibition interface is displayed in the graphical user interface, and the method includes steps of: displaying an article exhibition area with a preset size in the article exhibition interface, where the article exhibition area is configured to display a plurality of articles; determining, in response to an article selecting operation input for the article exhibition area, target articles selected by the article selecting operation; and reducing a size of the article exhibition area in the article exhibition interface, and displaying an information exhibition area in the article exhibition interface, where the information exhibition area is configured to display first information on the target articles.

Another embodiment of the present disclosure provides an interaction device for article exhibition, including a processor, a storage medium, and a bus, where the storage medium stores machine-readable instructions executable by the processor, and when the interaction device of article exhibition is running, the processor is in communication with the storage medium via the bus, and the processor executes the machine-readable instructions, so as to execute the steps of the method according to any one of the above first aspect.

Another embodiment of the present disclosure provides a non-transitory storage medium, where the storage medium stores a computer program, and the computer program, when executed by a processor, executes the steps of the method according to any one of the above first aspect.

BRIEF DESCRIPTION OF DRAWINGS

In order to more clearly illustrate the embodiments of the present disclosure, drawings which need to be used in the embodiments will be introduced below briefly. It should be understood that the drawings below merely show some embodiments of the present disclosure, and therefore should not be considered as limitation to the scope. Those ordinarily skilled in the art still could obtain other relevant drawings according to these drawings, without using any creative efforts.

DETAILED DESCRIPTION

In order to make objectives, technical solutions, and advantages of the embodiments of the present disclosure clearer, the technical solutions in the embodiments of the present disclosure will be described clearly and completely below with reference to the drawings in the embodiments of the present disclosure, and apparently, some but not all embodiments of the present disclosure are described.

Generally, components in the embodiments of the present disclosure described and shown in the drawings herein may be arranged and designed in different configurations. Therefore, the detailed description below of the embodiments of the present disclosure provided in the drawings is not intended to limit the scope of protection of the present disclosure, but merely represents chosen embodiments of the present disclosure. Based on the embodiments of the present disclosure, all of other embodiments obtained by a person skilled in the art without using any creative efforts shall fall within the scope of protection of the present disclosure.

In addition, the flowcharts used in the present disclosure show operations implemented according to some of the embodiments of the present disclosure. It should be understood that the operations of the flowcharts may be implemented out of order, and steps without contextual logic may be reversed in order or simultaneously implemented. In addition, one skilled in the art, guided by the present disclosure, may add one or more other operations to the flowcharts, or remove one or more operations from the flowcharts.

An interaction method for article exhibition provided in an embodiment of the present disclosure is explained below with reference to multiple specific application examples.

The interaction method for article exhibition in an embodiment of the present disclosure may run on a local terminal device or a server. When the interaction method for article exhibition runs on the server, this method can be realized and executed based on a cloud interaction system, where the cloud interaction system includes the server and a client device.

In an embodiment, the cloud interaction system may run various cloud applications, for example, a cloud game. Taking the cloud game as an example, the cloud game refers to a cloud computing-based game mode. In a running mode of the cloud game, a running subject of a game program and a game screen presentation subject are separated, storage and running of the interaction method for article exhibition are completed on a cloud game server, a client device functions to receive and transmit data and present the game screen, for example, the client device may be a display device with a data transmission function close to a user side, e.g., a mobile terminal, a television, a computer, a handheld computer, etc. However, the cloud game server in the cloud processes information. When playing, a player operates the client device to send an operation instruction to the cloud game server, the cloud game server runs the game according to the operation instruction, encodes and compresses data such as the game screen, and returns the same to the client device via network, and finally, the client device decodes the data and outputs the game screen.

In an embodiment, taking a game as an example, the local terminal device stores a game program and is configured to present a game screen. The local terminal device is configured to interact with a player via a graphical user interface, i.e., conventionally downloading and installing the game program and running the same through an electronic device. The local terminal device may provide the graphical user interface to the player in various manners, for example, the graphical user interface may be rendered and displayed on a display screen of the terminal, or may be provided to the player by means of holographical projection. For instance, the local terminal device may include a display screen and a processor, where the display screen is configured to present the graphical user interface, the graphical user interface includes the game screen, and the processor is configured to run the game, generate the graphical user interface, and control the display of the graphical user interface on the display screen.

By using the interaction method for article exhibition provided in the present disclosure, while the player views a plurality of articles in the article exhibition area, the first information on the target articles corresponding to the article selecting operation further can be displayed in the information exhibition area, so that when the article exhibition area is limited in space, the player still can view the first information on the target articles at the same time, without affecting experience of browsing other articles, which is beneficial to improving the users' browsing experience of browsing articles.

Figure 1:
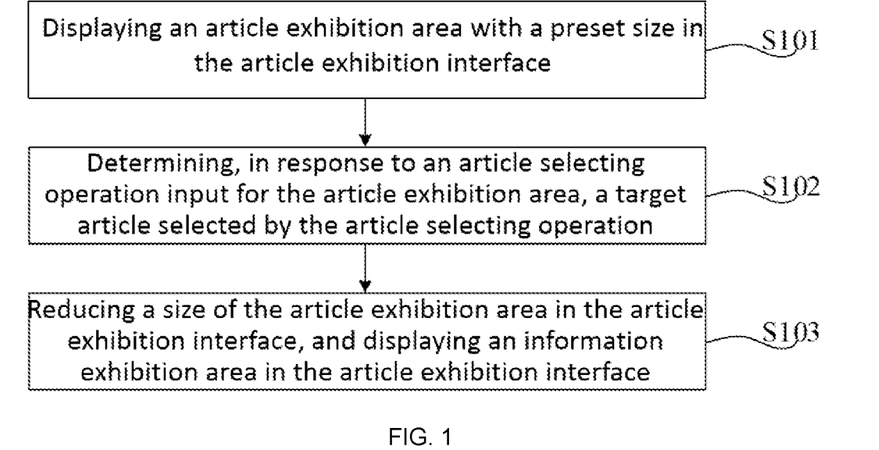
FIG. 1 is a schematic flowchart of an interaction method for article exhibition provided in an embodiment of the present disclosure.

An example of the present disclosure provides an interaction method for article exhibition, and a graphical user interface is provided by a terminal device, where the terminal device may be the local terminal device mentioned in the preceding, and also may be the client device in the cloud interaction system mentioned in the preceding. FIG. 1 is a schematic flowchart of an interaction method for article exhibition provided in an embodiment of the present disclosure, where a graphical user interface is provided by a terminal device, and an article exhibition interface is displayed in the graphical user interface. As shown in FIG. 1, the method includes the following steps.

S101: displaying an article exhibition area with a preset size in the article exhibition interface.

Figure 2:
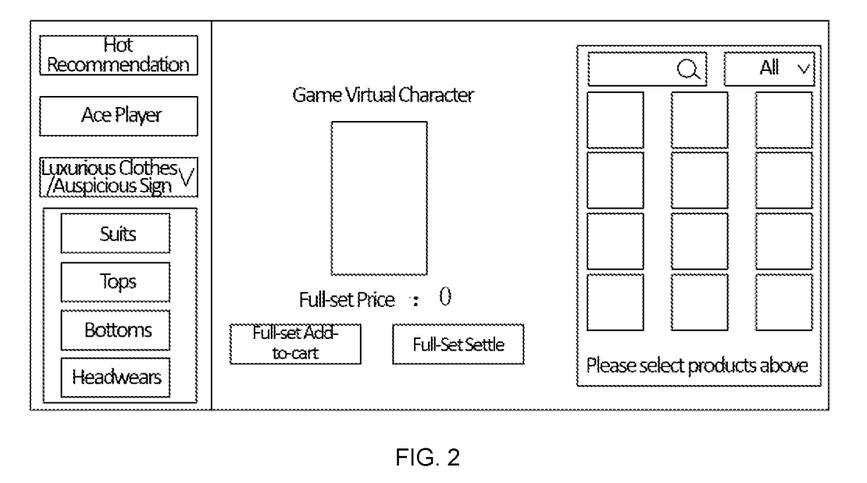
FIG. 2 is an interface schematic diagram of a graphical user interface provided in an embodiment of the present disclosure.

In the above, FIG. 2 is an interface schematic diagram of the graphical user interface provided in an embodiment of the present disclosure, and as shown in FIG. 2, the article exhibition area is configured to display a plurality of articles, where the plurality of articles, for example, can be arranged and displayed in the article exhibition area in a manner of displaying icons corresponding to various articles, where sizes of various icons, for example, can be the same, contents in the icons are style contents corresponding to various articles, and a player can intuitively view various articles according to the icons corresponding to various articles, and determine an article of interest.

The plurality of articles, for example, can be a plurality of articles under a target type selected by the player, as shown in FIG. 2, for example, if the player selects suits under "Luxurious Clothes/Auspicious Sign (Jin Yi Xiang Rui)", a plurality of corresponding suit articles under the type "Luxurious Clothes/Auspicious Sign" are displayed in the article exhibition area; if the player selects a plurality of articles under Hot Recommendation recommended by system, and if the player searches for "Tops" in search box and triggers the search, for example, a plurality of tops articles corresponding to "Tops" are displayed in the article exhibition area, where the search, for example, may be further screening under the type currently been selected, for example, if the player has selected "Luxurious Clothes/Auspicious Sign", then after the player searches for "Tops" and triggers the search, a search range, for example, may be only a plurality of tops articles searched under the type "Luxurious Clothes/Auspicious Sign"; or the search also may be a search for all articles. It should be understood that the above embodiment is merely for exemplary description, and a manner of determining a plurality of articles specifically displayed and a searching manner of the search both can be flexibly adjusted according to user requirements, and are not limited to what is given in the above embodiment.

S102: determining, in response to an article selecting operation input for the article exhibition area, a target article selected by the article selecting operation.

In the above, if the current terminal device is a computer device, the article selecting operation, for example, may be input by the player by an external mouse or an external keyboard, for example, after the player selects one article from a plurality of articles in the article exhibition area, the article corresponding to the current selecting operation is determined as the target article; and if the current terminal device is a mobile phone, the article selecting operation, for example, may be a touch screen operation performed by the player by a finger or other devices, and after one article is selected from a plurality of articles in the article exhibition area, the article corresponding to the current selecting operation is determined as the target article.

Figure 3:
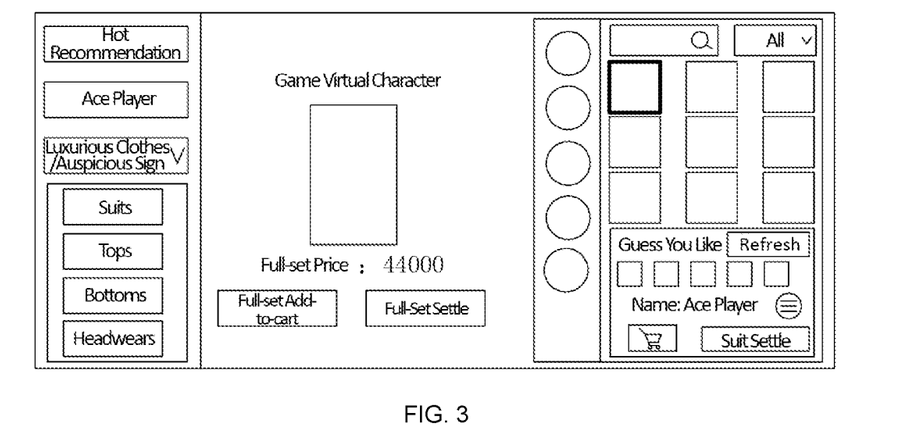
FIG. 3 is an interface schematic diagram of a graphical user interface provided in another embodiment of the present disclosure.

FIG. 3 is an interface schematic diagram of the graphical user interface provided in another embodiment of the present disclosure, and as shown in FIG. 3, after the target object selected is determined, a border of an icon corresponding to the target article, for example, can be displayed in bold, to be distinguished from display of other articles, so that the player can intuitively determine the target article corresponding to the current selecting operation from the plurality of articles. It should be understood that the above embodiment is merely for exemplary description, the border of the icon corresponding to the target article, for example, also can be highlight-displayed, or displayed in a display manner different from icons of other articles. A specific display manner of the target article can be flexibly adjusted according to the user requirements, and is not limited to what is given in the above embodiment.

S103: reducing a size of the article exhibition area in the article exhibition interface, and displaying an information exhibition area in the article exhibition interface.

The information exhibition area is configured to display first information on the target article.

As shown in FIG. 3, in one embodiment of the present disclosure, the article exhibition area and the information exhibition area are displayed in the article exhibition interface without overlapping each other, ensuring that the article exhibition area and the information exhibition area do not affect each other, so that the player not only can view a plurality of articles exhibited in the article exhibition area, but also can view the first information corresponding to the target article in the information exhibition area.

In some possible embodiments, the first information on the target article, for example, may be information on other articles related to the target article, for example, when the target article is tops, related articles, for example, may be shoes, bottoms, or headwears matching the tops; and/or the first information further may include attribute information on the target article, where the attribute information, for example, may include, but is not limited to: icon information, name information, virtual gold coin information required for settling the target article, and so on. It should be understood that the above embodiments are merely for exemplary description, and contents specifically included in the first information may be flexibly adjusted according to the user requirements, and are not limited to what is given in the above embodiments.

In some possible embodiments, when the first information includes the information on other articles related to the target article, the information exhibition area further may display a replacement control, as shown in FIG. 3, the replacement control, for example, can be displayed in a preset position around the information on other articles related to the target article in the information exhibition area, for example, an upper right corner of the information on other articles, which specifically can be flexibly adjusted according to the user requirements. In response to a trigger operation on the replacement control, the information on other articles in the article exhibition area is updated, i.e., in response to the trigger operation on the replacement control, a batch of information on other articles related to the target article is replaced and displayed in the information exhibition area.

In some examples, when the first information includes the attribute information on the target article, the information exhibition area further displays an expansion control; and as shown in FIG. 3, the expansion control, for example, can be displayed on one side of the name information on the target article in the information exhibition area, a display manner, for example, may be a form of displaying a preset icon, or a form of displaying a preset name, and a display position and the display manner thereof are not limited herein in any way in the present disclosure; and in response to a trigger operation on the expansion control, third information on the target article is displayed, where an information amount in the third information is greater than an information amount in the first information.

In some other possible embodiments, for example, a preset pop-up window can pop up in the article exhibition interface in response to the trigger operation on the expansion control, where the preset pop-up window is configured to display the third information; after viewing the third information, the player, for example, can close the preset pop-up window, and continue to browse other articles in the article exhibition interface, or browse target first information. A specific display manner of the third information may be flexibly adjusted according to the user requirements, and is not limited to what is given in the above embodiments.

By using the interaction method for article exhibition provided in the present disclosure, while the player views a plurality of articles in the article exhibition area, the first information on the target articles corresponding to the article selecting operation further can be displayed in the information exhibition area, so that when the article exhibition area is limited in space, the player still can view the first information on the target articles at the same time, without affecting experience of browsing other articles, which is beneficial to improving the users' browsing experience of browsing articles.

As shown in FIG. 3, in an embodiment of the present disclosure, a virtual character exhibition area is further displayed in the graphical user interface, and a game virtual character wearing at least one target article is displayed in the virtual character exhibition area.

In the above, in some possible embodiments, for example, there may be one target article, and in this case, the game virtual character in the virtual character exhibition area only needs to wear this target article for display; there also may be a plurality of target articles, and when there are a plurality of target articles, in this case, the game virtual character in the virtual character exhibition area will wear a plurality of target articles for display, where the plurality of target articles simultaneously worn on the game virtual character need to be articles of a plurality of different types, that is, the game virtual character can only wear a combination of one tops article, one bottoms article and/or one headwear article, etc. at the same time, and if the target article includes a plurality of tops articles, the last selected tops article can be determined as the tops article to be worn by the current game virtual character, for example. It should be understood that the above embodiments are merely for exemplary description, and a specific manner in which the game virtual character wears the articles can be flexibly adjusted according to the user requirements, and is not limited to what is given in the above embodiments.

In some possible embodiments, the game virtual character in the virtual character exhibition area is a game virtual character that can be rotated to view, and the player, for example, can click on a preset rotation control, to control the game virtual character to rotate in a rotation direction and a rotation angle corresponding to the preset rotation control; or by rotating the game virtual character within a preset range of the game virtual character, view the game virtual character from various angles after wearing the target article. It should be understood that a specific manner in which the player views the game virtual character can be flexibly adjusted according to the user requirements, and is not limited to what is given in the above embodiments.

As shown in FIG. 3, in the virtual character exhibition area, for example, price information corresponding to all target articles to be worn by the current game virtual character, and a full-set add-to-cart control and a full-set settlement control further may be displayed. In some possible embodiments, for example, in response to a trigger operation on the full-set add-to-cart control, adding to the cart all target articles to be worn by the current game virtual character is triggered, and after subsequently clicking on a cart control, the player can confirm the plurality of target articles having been added to the cart, for example, the player can delete or increase the number of the plurality of articles having been added to the cart, and return to the article exhibition area after confirming no error and continue purchasing, or settle the plurality of articles having been determined in the cart.

In an embodiment of the present disclosure, the cart control, for example, can be displayed with a cart icon in a preset position in the information exhibition area. A specific display position of the cart can be flexibly adjusted according to the user requirements, for example, also can be displayed in the virtual character exhibition area, or displayed in the article exhibition area. Specific display manner and display position of the cart control can be flexibly adjusted according to the user requirements, and are not limited herein in any way in the present disclosure.

Besides, for the full-set settlement control, settlement of all target articles to be worn by the game virtual character can be triggered in response to a trigger operation on the full-set settlement control.

In some other possible embodiments, as shown in FIG. 3, in the information exhibition area, for example, a settlement control further may be displayed, for determining to settle the target article in response to a trigger operation on the settlement control, where the target article may be a single article, and also may be a set of articles (a set of articles includes a plurality of articles), then a display manner of the settlement control is related to attributes of the article, where if the target article is a single article, the settlement control, for example, can be displayed as "Settlement control", and after this control is triggered, only a single target article currently selected will be settled; or the target article is a set of set articles, the settlement control, for example, can be displayed as "Suit settlement" control, and after this control is triggered, a plurality of articles corresponding to the current set of articles will be settled. It should be understood that the above embodiments are merely for exemplary description, and a specific display manner of the settlement control can be flexibly adjusted according to the user requirements, and is not limited to what is given in the above embodiments.

As shown in FIG. 3, in one embodiment of the present disclosure, if the target article has a plurality of configuration states, the method further includes a step of: displaying an article configuration area in the graphical user interface in response to the article selecting operation input for the article exhibition area, where the article configuration area is configured to display the target article in a plurality of configuration states.

For example, the article configuration area can be spliced and displayed on the right side of the article exhibition area, where in the article configuration area, for example, display icons corresponding to different color matching information corresponding to the target articles can be displayed, where only for a target article with a plurality of configuration states, the article configuration area will be displayed in the graphical user interface, and if the target article does not have a plurality of configuration states, the article configuration area will not be displayed in the graphical user interface, or display content in the article configuration area is null. Flexible adjustment can be made according to the user requirements, and it is not limited to what is given in the above embodiment.

Figure 4:
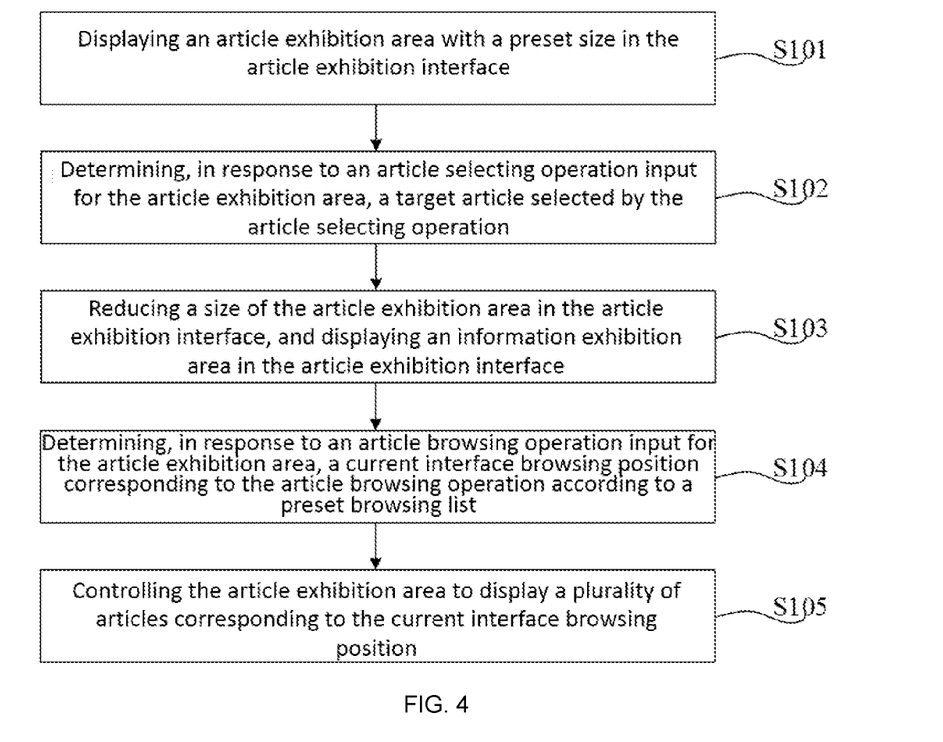
FIG. 4 is a schematic flowchart of an interaction method for article exhibition provided in another embodiment of the present disclosure.

In an embodiment, based on the above embodiments, an embodiment of the present disclosure further may provide an interaction method for article exhibition, and an implementation process of the above method is illustrated below with reference to the drawings. FIG. 4 is a schematic flowchart of the interaction method for article exhibition provided in another embodiment of the present disclosure, and as shown in FIG. 4, this method further may include the following steps.

S104: determining, in response to an article browsing operation input for the article exhibition area, a current interface browsing position corresponding to the article browsing operation according to a preset browsing list.

In some examples, in some possible embodiments, an input manner of the article browsing operation input for the article exhibition area, for example, may be that an external device such as a mouse, when cursor stays in the article exhibition area, in response to a sliding operation on a sliding component on the mouse, controls the articles displayed in the article exhibition area to move downwards or upwards to different browsing positions according to a sliding direction and a sliding distance of the sliding operation, where with movement of the sliding operation, the current interface browsing position corresponding to the browsing operation is determined in the article exhibition area according to the browsing list and the sliding distance; the input manner also may be, in response to a click operation and a sliding operation continuous with the click operation of the player by a finger or other devices in the article exhibition area on the display screen of the terminal device, controlling the articles displayed in the article exhibition area to move downwards or upwards to different browsing positions according to a sliding direction and a sliding distance of the sliding operation, so that the article exhibition area exhibits a plurality of articles corresponding to the current browsing position. It should be understood that the above embodiments are merely for exemplary description, and a specific browsing manner of the browsing operation can be flexibly adjusted according to the user requirements, and is not limited to what is given in the above embodiments.

S105: controlling the article exhibition area to display a plurality of articles corresponding to the current interface browsing position.

In the above, a plurality of articles correspondingly displayed at different interface browsing positions are different, until the article exhibition area is slid to the bottom or the top, for example, when the article exhibition area has been slid to the bottom, at this time, if the browsing operation is still downward sliding, the browsing position at this time will remain at the bottom and will no longer move downwards; and by the same reasoning, if the article exhibition area has been slid to the top, at this time, if the browsing operation is still upward sliding, the browsing position at this time will remain at the top and will no longer move upwards.

In an embodiment of the present disclosure, in a browsing process according to the browsing operation, a size of the article exhibition area is increased and a size of the information exhibition area is reduced in the article exhibition interface in response to the article browsing operation; the increased article exhibition area has a size smaller than the preset size; and second information on the target article is displayed in the size-reduced information exhibition area, where an information amount in the second information is smaller than an information amount in the first information.

Figure 5:
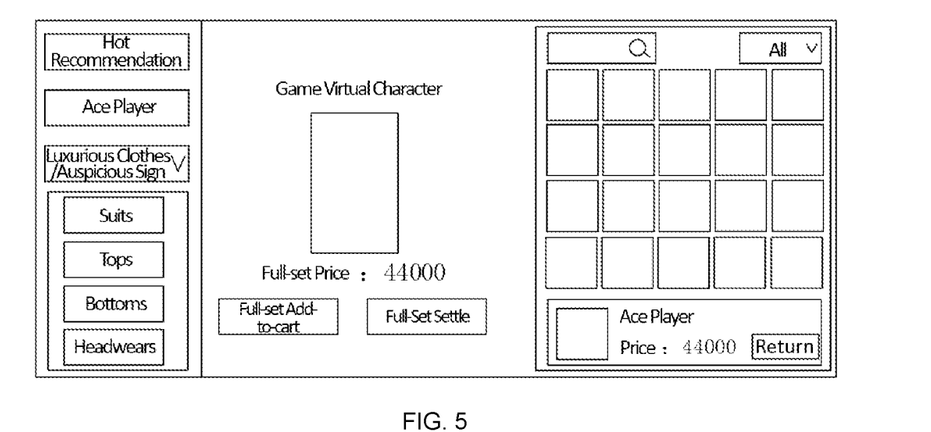
FIG. 5 is an interface schematic diagram of a graphical user interface provided in a further embodiment of the present disclosure.

FIG. 5 is an interface schematic diagram of the graphical user interface provided in a further embodiment of the present disclosure, and as shown in FIG. 5, the size of the article exhibition area will be increased and the size of the information exhibition area will be reduced in the article exhibition interface in response to the article browsing operation, and the article exhibition area and the information exhibition area having been changed in size still remain not overlapping each other.

As shown in FIG. 5, the second information on the target article exhibited in the size-reduced information exhibition area, for example, only includes icon information and name information on the target article, virtual gold coin information required for settling this target article, and so on, and information on related articles related to the target article is no longer displayed. It should be understood that the above embodiment is merely for exemplary description, and specific contents included in the second information can be flexibly adjusted according to the user requirements, and are not limited to what is given in the above embodiment.

In some possible embodiments, a trigger manner in which sizes of various areas in the article exhibition interface are adjusted, for example, may be: determining an interface sliding distance corresponding to the article browsing operation in response to the article browsing operation; and when the interface sliding distance is greater than or equal to a preset distance threshold, increasing the size of the article exhibition area, and reducing the size of the information exhibition area in the article exhibition interface.

That is, only when the interface sliding distance exceeds the preset distance threshold, the sizes of various areas in the article exhibition interface are adjusted, where the preset distance threshold is set in advance, and can be configured in advance according to different effects, which is not limited herein in any way in the present disclosure.

As shown in FIG. 5, for example, the article exhibition interface further displays a return control; for example, the return control can be provided in the information exhibition area in the article exhibition interface, for example, displayed at lower right of the information exhibition area, then in response to a trigger operation on the return control, the sizes of the article exhibition area and the information exhibition area are restored to corresponding sizes before a first article browsing operation is input; a plurality of articles exhibited before the first article browsing operation is input are displayed in the article exhibition area, and the first information is displayed in the information exhibition area. It should be understood that the above embodiment is merely for exemplary description, and a specific display position of the return control can be flexibly adjusted according to the user requirements, and is not limited to what is given in the above embodiment.

That is, after the player triggers the return control, it will return to the browsing position before the first browsing operation, the article exhibition area is controlled to restore the size before the first operation, and a plurality of articles including the target article are displayed in the article exhibition area; and the information exhibition area is controlled to restore the size before the first operation, and the first information corresponding to the target article is displayed in the information exhibition area.

Figure 6:
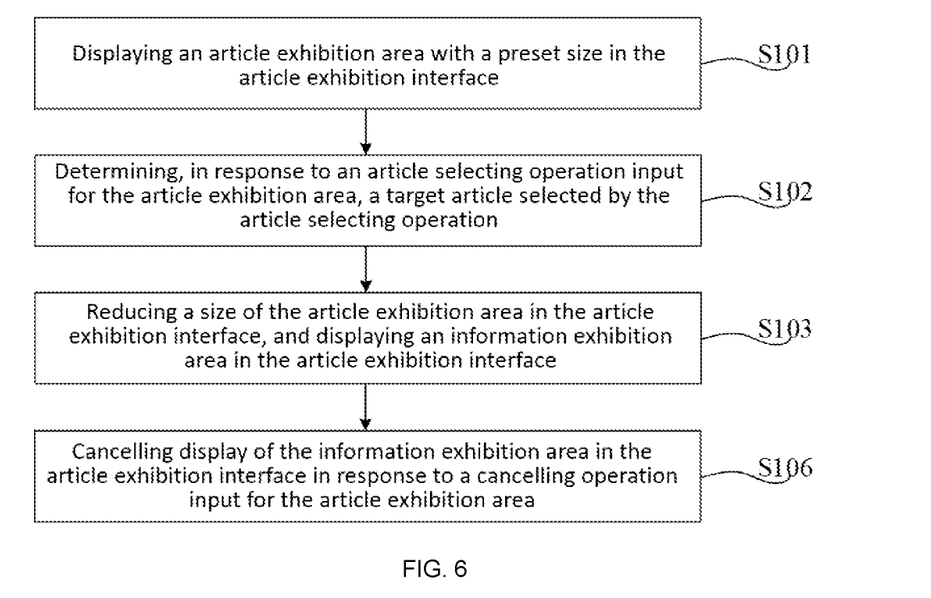
FIG. 6 is a schematic flowchart of an interaction method for article exhibition provided in a further embodiment of the present disclosure.

In an embodiment, on the basis of the above embodiments, an embodiment of the present disclosure further may provide an interaction method for article exhibition, and an implementation process of the above method is illustrated below with reference to the drawings. FIG. 6 is a schematic flowchart of the interaction method for article exhibition provided in yet another embodiment of the present disclosure, and as shown in FIG. 6, this method further may include:

S106: cancelling display of the information exhibition area in the article exhibition interface in response to a cancelling operation input for the article exhibition area.

In an embodiment of the present disclosure, the cancelling operation, for example, may be a re-selecting operation on the target article, that is, in cases where the target article is already selected, re-selecting the target article will cancel the selection for the target article, that is, triggering the cancelling operation; or the cancelling operation, for example, also may be, in response to a trigger operation on a preset cancellation control, or a preset cancellation shortcut key or a preset cancellation shortcut gesture, triggering the cancelling operation, and cancelling display of the information exhibition area in the article exhibition interface, and displaying the article exhibition area only in the article exhibition interface. It should be understood that the above embodiment is merely for exemplary description, and a specific trigger operation of the cancelling operation can be flexibly adjusted according to the user requirements, and is not limited to what is given in the above embodiment.

By using the interaction method for article exhibition provided in the present disclosure, while the player views a plurality of articles in the article exhibition area, the first information on the target articles corresponding to the article selecting operation further can be displayed in the information exhibition area, so that when the article exhibition area is limited in space, the article exhibition area and the information exhibition area can be allocated in the limited space in a targeted manner, the player still can view the first information on the target articles at the same time, without affecting experience of browsing other articles. Moreover, according to the browsing operation of the player, an area that the player wants to browse can be judged, and the size of the article exhibition area can be expanded, when the player wants to return to the currently selected target article, the player also can return to the position of the target article by the return control for subsequent operations. Such a setting manner is beneficial to improving the user's browsing experience of browsing the articles.

An interaction apparatus for article exhibition provided in the present disclosure is illustrated below with reference to the drawings. This interaction apparatus for article exhibition can execute any interaction method for article exhibition according to FIG. 1 to FIG. 6 in the above, and for specific implementation and beneficial effects thereof, reference is made to the above, and details are not described herein again.

Figure 7:
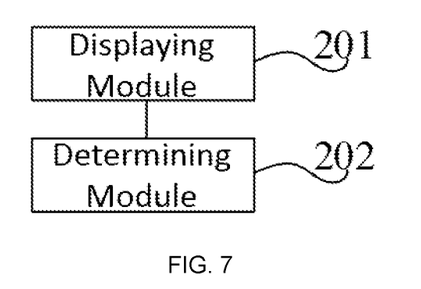
FIG. 7 is a structural schematic diagram of an interaction apparatus for article exhibition provided in an embodiment of the present disclosure.

FIG. 7 is a structural schematic diagram of the interaction apparatus for article exhibition provided in an embodiment of the present disclosure, and as shown in FIG. 7, this apparatus includes: a displaying module 201 and a determining module 202, where the displaying module 201 is configured to display an article exhibition area with a preset size in an article exhibition interface, where the article exhibition area is configured to display a plurality of articles;

the determining module 202 is configured to determine, in response to an article selecting operation input for the article exhibition area, a target article selected by the article selecting operation; and the displaying module 201 is configured to specifically reduce a size of the article exhibition area in the article exhibition interface, and display an information exhibition area in the article exhibition interface, where the information exhibition area is configured to display first information on the target article.

In an embodiment, a virtual character exhibition area is further displayed in a graphical user interface, and the displaying module 201 is configured to specifically display a game virtual character wearing at least one target article in the virtual character exhibition area.

In an embodiment, the determining module 202 is configured to specifically determine, in response to a trigger operation on a settlement control, to settle the target article.

In an embodiment, the article exhibition area and the information exhibition area are displayed in the article exhibition interface without overlapping each other.

In an embodiment, the determining module 202 is configured to specifically determine, in response to an article browsing operation input for the article exhibition area, a current interface browsing position corresponding to the article browsing operation according to a preset browsing list.

The displaying module 201 is configured to specifically control the article exhibition area to display a plurality of articles corresponding to the current interface browsing position.

In an embodiment, the displaying module 201 is configured to specifically increase a size of the article exhibition area and reduce a size of the information exhibition area in the article exhibition interface in response to the article browsing operation, the increased article exhibition area having a size smaller than the preset size; and display second information on the target article in the size-reduced information exhibition area, where an information amount in the second information is smaller than an information amount in the first information.

In an embodiment, the determining module 202 is configured to specifically determine an interface sliding distance corresponding to the article browsing operation in response to the article browsing operation; and when the interface sliding distance is greater than or equal to a preset distance threshold, increase the size of the article exhibition area, and reduce the size of the information exhibition area in the article exhibition interface.

Figure 8:
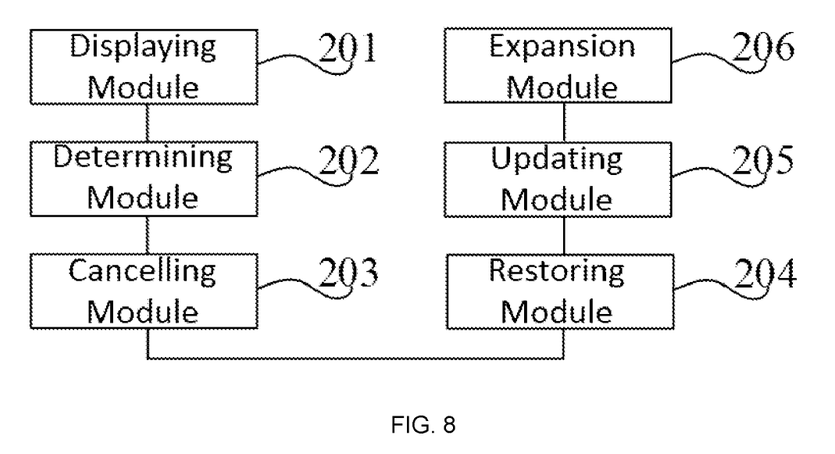
FIG. 8 is a structural schematic diagram of an interaction apparatus for article exhibition provided in another embodiment of the present disclosure.

In an embodiment, based on the above embodiments, an embodiment of the present disclosure further may provide an interaction apparatus for article exhibition, and an implementation process of the above apparatus provided in FIG. 7 is illustrated below with reference to the drawings. FIG. 8 is a structural schematic diagram of an interaction apparatus for article exhibition provided in another embodiment of the present disclosure, and as shown in FIG. 8, this apparatus further includes a cancelling module 203, configured to cancel display of the information exhibition area in the article exhibition interface in response to a cancelling operation input for the article exhibition area.

In an embodiment, the article exhibition interface further displays a return control; and as shown in FIG. 8, this apparatus further includes a restoring module 204, configured to restore the sizes of the article exhibition area and the information exhibition area to corresponding sizes before a first article browsing operation is input, in response to a trigger operation on the return control; and the displaying module 201 is configured to specifically display a plurality of articles exhibited before the first article browsing operation is input in the article exhibition area, and display the first information in the information exhibition area.

In an embodiment, the first information includes information on other articles related to the target article and/or attribute information on the target article.

In an embodiment, when the first information includes the information on other articles related to the target article, the information exhibition area further displays a replacement control; and as shown in FIG. 8, this apparatus further includes an updating module 205, configured to update the information on other articles in the article exhibition area in response to a trigger operation on the replacement control.

In an embodiment, when the first information includes the attribute information on the target article, the information exhibition area further displays an expansion control; and as shown in FIG. 8, this apparatus further includes an expansion module 206, configured to display third information on the target article in response to a trigger operation on the expansion control, where an information amount in the third information is greater than an information amount in the first information.

In an embodiment, the displaying module 201 is configured to specifically pop up a preset pop-up window in the article exhibition interface in response to the trigger operation on the expansion control, where the preset pop-up window is configured to display the third information.

In an embodiment, if the target article has a plurality of configuration states, the displaying module 201 is configured to specifically display an article configuration area in the graphical user interface in response to an article selecting operation input for the article exhibition area, where the article configuration area is configured to display the target article in a plurality of configuration states.

The above apparatus is configured to execute the method provided in the preceding embodiments, and has similar implementation principle and technical effects, which are not described herein again.

These above modules may be one or more integrated circuits configured to implement the above method, for example, one or more application specific integrated circuits (ASIC for short), or one or more microprocessors, or one or more field programmable gate arrays (FPGA for short), etc. For another example, when a certain module in the above is implemented in the form of a processing element scheduling program code, the processing element may be a general purpose processor, for example, a central processing unit (CPU for short) or other processors that can invoke the program code. For another example, these modules may be integrated together and implemented in the form of a system-on-a-chip (SOC for short).

Figure 9:
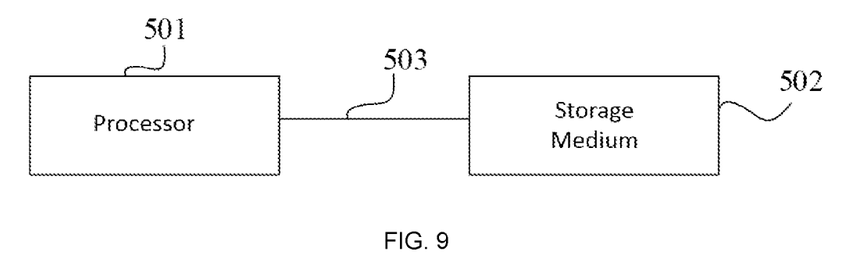
FIG. 9 is a structural schematic diagram of an interaction device for article exhibition provided in an embodiment of the present disclosure.

FIG. 9 is a structural schematic flowchart of an interaction device for article exhibition provided in an embodiment of the present disclosure, and this interaction device for article exhibition may be integrated into a terminal device or a chip of a terminal device.

As shown in FIG. 9, this interaction device for article exhibition includes: a processor 501, a storage medium 502, and a bus 503.

The memory 501 is configured to store a program, and the processor 501 invokes the program stored in the storage medium 502, so as to execute the steps of the interaction method for article exhibition corresponding to the above FIG. 1 to FIG. 6.

For example, the above interaction method for article exhibition may include steps of:

displaying an article exhibition area with a preset size in the article exhibition interface, where the article exhibition area is configured to display a plurality of articles;

determining, in response to an article selecting operation input for the article exhibition area, target articles selected by the article selecting operation; and reducing a size of the article exhibition area in the article exhibition interface, and displaying an information exhibition area in the article exhibition interface, where the information exhibition area is configured to display first information on the target articles.

In an embodiment, a virtual character exhibition area is further displayed in the graphical user interface, and the method further includes a step of:

displaying a game virtual character wearing at least one of the target articles in the virtual character exhibition area.

In an embodiment, a settlement control is further displayed in the information exhibition area, and the method further includes a step of:

determining to settle the target articles in response to a trigger operation on the settlement control.

In an embodiment, the article exhibition area and the information exhibition area are displayed in the article exhibition interface without overlapping each other.

In an embodiment, the method further includes steps of:

determining, in response to an article browsing operation input for the article exhibition area, a current interface browsing position corresponding to the article browsing operation according to a preset browsing list; and controlling the article exhibition area to display a plurality of articles corresponding to the current interface browsing position.

In an embodiment, the method further includes steps of:

increasing a size of the article exhibition area and reducing a size of the information exhibition area in the article exhibition interface in response to the article browsing operation, the increased article exhibition area having a size smaller than the preset size; and displaying second information on the target articles in the size-reduced information exhibition area, where an information amount in the second information is smaller than an information amount in the first information.

In an embodiment, the step of increasing a size of the article exhibition area and reducing a size of the information exhibition area in the article exhibition interface in response to the article browsing operation includes steps of:

determining an interface sliding distance corresponding to the article browsing operation in response to the article browsing operation; and when the interface sliding distance is greater than or equal to a preset distance threshold, increasing the size of the article exhibition area, and reducing the size of the information exhibition area in the article exhibition interface.

In an embodiment, the method further includes a step of:

cancelling display of the information exhibition area in the article exhibition interface in response to a cancelling operation input for the article exhibition area.

In an embodiment, a return control is further displayed in the article exhibition interface, and the method further includes steps of:

restoring the sizes of the article exhibition area and the information exhibition area to corresponding sizes before a first article browsing operation is input, in response to a trigger operation on the return control; and displaying in the article exhibition area a plurality of articles exhibited before the first article browsing operation is input, and displaying the first information in the information exhibition area.

In an embodiment, the first information includes information on other articles related to the target articles and/or attribute information on the target articles.

In an embodiment, when the first information includes the information on other articles related to the target articles, the information exhibition area further displays a replacement control; and the method further includes a step of:

updating the information on other articles in the article exhibition area in response to a trigger operation on the replacement control.

In an embodiment, when the first information includes the attribute information on the target articles, the information exhibition area further displays an expansion control; and the method further includes a step of:

displaying third information on the target articles in response to a trigger operation on the expansion control, where an information amount in the third information is greater than an information amount in the first information.

In an embodiment, the step of displaying third information on the target articles in response to a trigger operation on the expansion control includes a step of:

popping up a preset pop-up window in the article exhibition interface in response to the trigger operation on the expansion control, where the preset pop-up window is configured to display the third information.

In an embodiment, if the target articles have a plurality of configuration states, the method further includes a step of:

displaying an article configuration area in the graphical user interface in response to an article selecting operation input for the article exhibition area, where the article configuration area is configured to display the target articles in a plurality of configuration states.

By using the interaction method for article exhibition provided in the present disclosure, while the player views a plurality of articles in the article exhibition area, the first information on the target articles corresponding to the article selecting operation further can be displayed in the information exhibition area, so that when the article exhibition area is limited in space, the player still can view the first information on the target articles at the same time, without affecting experience of browsing other articles, which is beneficial to improving the users' browsing experience of browsing articles.

In an embodiment, the present disclosure further provides a program product, for example, a storage medium. The storage medium stores a computer program, including a program, and when being run by a processor, the program executes the steps of the interaction method for article exhibition corresponding to the above method.

For example, the above interaction method for article exhibition may include steps of:

displaying an article exhibition area with a preset size in an article exhibition interface, where the article exhibition area is configured to display a plurality of articles;

determining, in response to an article selecting operation input for the article exhibition area, target articles selected by the article selecting operation;

reducing a size of the article exhibition area in the article exhibition interface, and displaying an information exhibition area in the article exhibition interface, where the information exhibition area is configured to display first information on the target articles.

In an embodiment, a virtual character exhibition area is further displayed in the graphical user interface, and the method further includes a step of:

displaying a game virtual character wearing at least one of the target articles in the virtual character exhibition area.

In an embodiment, a settlement control is further displayed in the information exhibition area, and the method further includes a step of:

determining to settle the target articles in response to a trigger operation on the settlement control.

In an embodiment, the article exhibition area and the information exhibition area are displayed in the article exhibition interface without overlapping each other.

In an embodiment, the method further includes a step of:

determining, in response to an article browsing operation input for the article exhibition area, a current interface browsing position corresponding to the article browsing operation according to a preset browsing list; and controlling the article exhibition area to display a plurality of articles corresponding to the current interface browsing position.

In an embodiment, the method further includes steps of:

increasing a size of the article exhibition area and reducing a size of the information exhibition area in the article exhibition interface in response to the article browsing operation, the increased article exhibition area having a size smaller than the preset size; and displaying second information on the target articles in the size-reduced information exhibition area, where an information amount in the second information is smaller than an information amount in the first information.

In an embodiment, the step of increasing a size of the article exhibition area and reducing a size of the information exhibition area in the article exhibition interface in response to the article browsing operation includes steps of:

determining an interface sliding distance corresponding to the article browsing operation in response to the article browsing operation; and when the interface sliding distance is greater than or equal to a preset distance threshold, increasing the size of the article exhibition area, and reducing the size of the information exhibition area in the article exhibition interface.

In an embodiment, the method further includes a step of:

cancelling display of the information exhibition area in the article exhibition interface in response to a cancelling operation input for the article exhibition area.

In an embodiment, a return control is further displayed in the article exhibition interface, and the method further includes steps of:

restoring the sizes of the article exhibition area and the information exhibition area to corresponding sizes before a first article browsing operation is input, in response to a trigger operation on the return control; and displaying in the article exhibition area a plurality of articles exhibited before the first article browsing operation is input, and displaying the first information in the information exhibition area.

In an embodiment, the first information includes information on other articles related to the target articles and/or attribute information on the target articles.

In an embodiment, when the first information includes the information on other articles related to the target articles, the information exhibition area further displays a replacement control; and the method further includes a step of:

updating the information on other articles in the article exhibition area in response to a trigger operation on the replacement control.

In an embodiment, when the first information includes the attribute information on the target articles, the information exhibition area further displays an expansion control; and the method further includes a step of:

displaying third information on the target articles in response to a trigger operation on the expansion control, where an information amount in the third information is greater than an information amount in the first information.

In an embodiment, the step of displaying third information on the target articles in response to a trigger operation on the expansion control includes a step of:

popping up a preset pop-up window in the article exhibition interface in response to the trigger operation on the expansion control, where the preset pop-up window is configured to display the third information.

In an embodiment, if the target articles have a plurality of configuration states, the method further includes a step of:

displaying an article configuration area in the graphical user interface in response to an article selecting operation input for the article exhibition area, where the article configuration area is configured to display the target articles in a plurality of configuration states.

By using the interaction method for article exhibition provided in the present disclosure, while the player views a plurality of articles in the article exhibition area, the first information on the target articles corresponding to the article selecting operation further can be displayed in the information exhibition area, so that when the article exhibition area is limited in space, the player still can view the first information on the target articles at the same time, without affecting experience of browsing other articles, which is beneficial to improving the users' browsing experience of browsing articles.

In the several embodiments provided in the present disclosure, it should be understood that the disclosed apparatus and method may also be implemented in other manners. For example, the apparatus embodiment described in the above is merely exemplary, for example, the units are merely divided according to logical functions, but they may be divided in other manners in practical implementation, for example, multiple units or components may be combined or may be integrated into another system, or some features may be omitted, or not executed. In addition, the mutual coupling, or direct coupling or communication connection illustrated or discussed may be implemented via indirect coupling or communication connection between some interfaces, apparatus, or units, which may be electronic, mechanical, or in other forms.

The units described as separate parts may be or also may not be physically separated, the parts displayed as units may be or also may not be physical units, i.e., they may be located at one place, or also may be distributed on a plurality of network units. Some or all of the units may be selected according to actual needs to achieve the objectives of the solutions in the embodiments.

Besides, various functional units in various embodiments of the present disclose may be integrated into one processing unit, or each unit also may exist in a physically independent way, or two or more than two units also may be integrated into one unit. The above integrated unit may be implemented in the form of hardware, or in the form of hardware plus a software functional unit.

The above integrated unit implemented in a form of software functional unit may be stored in one computer readable storage medium. The above software functional unit is stored in one storage medium, including several instructions used to make one computer device (which can be a personal computer, a sever or a network device etc.) or a processor execute some of the steps of the methods of various embodiments of the present disclosure. The aforementioned storage medium includes various media that can store program codes such as U disk, mobile hard disk, read-only memory (ROM for short), random access memory (RAM for short), magnetic disk or optical disk.

The present disclosure provides an interaction method for article exhibition, an interaction apparatus for article exhibition, an interaction device for article exhibition and a storage medium, relating to the technical field of computers. The method includes: displaying an article exhibition area with a preset size in the article exhibition interface, where the article exhibition area is configured to display a plurality of articles; determining, in response to an article selecting operation input for the article exhibition area, target articles selected by the article selecting operation; and reducing a size of the article exhibition area in the article exhibition interface, and displaying an information exhibition area in the article exhibition interface, where the information exhibition area is configured to display first information on the target articles. Compared with some art, the users' requirement of quickly switching and browsing the articles may be fulfilled.

Besides, it can be understood that the interaction method for article exhibition, the interaction apparatus for article exhibition, the interaction device for article exhibition, and the storage medium in the present disclosure may be reproduced, and may be used in a variety of industrial applications. For example, the interaction method, apparatus, and device for article exhibition and the storage medium in the present disclosure can be used in the technical field of games.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

What is claimed is:

1. An interaction method for article exhibition, comprising:

displaying, on a graphical user interface provided by a terminal device, an article exhibition area of a preset size in an article exhibition interface, wherein the article exhibition interface is displayed on the graphical user interface, and the article exhibition area is configured to display a plurality of articles;

in response to an article selecting operation input for the article exhibition area, determining, by the terminal device, a target article selected by the article selecting operation;

reducing a size of the article exhibition area in the article exhibition interface, and displaying an information exhibition area in the article exhibition interface, wherein the information exhibition area is configured to display first information on the target article;

determining, in response to an article browsing operation input for the article exhibition area, a current interface browsing position corresponding to the article browsing operation according to a preset browsing list;

displaying a plurality of articles in the article exhibition area corresponding to the current interface browsing position;

increasing a size of the article exhibition area and reducing a size of the information exhibition area in the article exhibition interface in response to the article browsing operation, wherein a size of increased article exhibition area is smaller than the preset size; and displaying second information on the target article in size-reduced information exhibition area, wherein amount of information in the second information is smaller than amount of information in the first information;

wherein increasing the size of the article exhibition area and reducing the size of the information exhibition area in the article exhibition interface in response to the article browsing operation comprises:
- determining an interface sliding distance corresponding to the article browsing operation in response to the article browsing operation; and
- increasing the size of the article exhibition area and reducing the size of the information exhibition area in the article exhibition interface, in response to the interface sliding distance being greater than or equal to a preset distance threshold.

2. The method according to claim 1, wherein a virtual character exhibition area is displayed in the graphical user interface, and the method further comprises:
- displaying a game virtual character wearing at least one target article in the virtual character exhibition area.

3. The method according to claim 1, wherein a settlement control is displayed in the information exhibition area, and the method further comprises:
- in response to a trigger operation on the settlement control, settling the target article.

4. The method according to claim 2, wherein the game virtual character is rotatable in a rotation direction and a rotation angle corresponding to a preset rotation control.

5. The method according to claim 1, wherein the article exhibition area and the information exhibition area are displayed in the article exhibition interface without overlapping each other.

6. The method according to claim 1, wherein the method further comprises:
- cancelling display of the information exhibition area in the article exhibition interface in response to a cancelling operation input for the article exhibition area.

7. The method according to claim 1, wherein a return control is displayed in the article exhibition interface, and the method further comprises:
- restoring sizes of the article exhibition area and the information exhibition area to corresponding sizes before a first article browsing operation is input, in response to a trigger operation on the return control; and
- displaying in the article exhibition area a plurality of articles exhibited before the first article browsing operation is input, and displaying the first information in the information exhibition area.

8. The method according to claim 1, wherein the first information comprises information on other articles related to the target article or attribute information on the target article.

9. The method according to claim 8, wherein in response to determining that the first information comprises the information on other articles related to the target articles, the information exhibition area further displays a replacement control; and the method further comprises:
- updating the information on other articles in the article exhibition area in response to a trigger operation on the replacement control.

10. The method according to claim 8, wherein in response to determining that the first information comprises the attribute information on the target article, the information exhibition area further displays an expansion control; and the method further comprises:
- displaying third information on the target article in response to a trigger operation on the expansion control, wherein amount of information in the third information is greater than amount of information in the first information.

11. The method according to claim 10, wherein displaying the third information on the target article in response to the trigger operation on the expansion control comprises:
- popping up a preset pop-up window in the article exhibition interface in response to the trigger operation on the expansion control, wherein the preset pop-up window is configured to display the third information.

12. The method according to claim 8, wherein the attribute information comprises: icon information, name information, or virtual gold coin information required for settling the target article.

13. The method according to claim 1, wherein in response to determining that the target article comprises a plurality of configuration states, the method further comprises:
- displaying an article configuration area in the graphical user interface in response to an article selecting operation input for the article exhibition area, wherein the article configuration area is configured to display the target article in the plurality of configuration states.

14. An interaction device of article exhibition, wherein the device comprises: a processor, a non-transitory storage medium, and a bus, the non-transitory storage medium stores machine-readable instructions executable by the processor, and when the interaction device of article exhibition is running, the processor is in communication with the storage medium via the bus, and the processor executes the machine-readable instructions, so as to execute an interaction method for article exhibition, comprising:
- displaying, on a graphical user interface provided by the interaction device, an article exhibition area of a preset size in an article exhibition interface, wherein the article exhibition interface is displayed on the graphical user interface, and the article exhibition area is configured to display a plurality of articles;
- in response to an article selecting operation input for the article exhibition area, determining a target article selected by the article selecting operation;
- reducing a size of the article exhibition area in the article exhibition interface, and displaying an information exhibition area in the article exhibition interface, wherein the information exhibition area is configured to display first information on the target article;
- determining, in response to an article browsing operation input for the article exhibition area, a current interface browsing position corresponding to the article browsing operation according to a preset browsing list;
- displaying a plurality of articles in the article exhibition area corresponding to the current interface browsing position;
- increasing a size of the article exhibition area and reducing a size of the information exhibition area in the article exhibition interface in response to the article browsing operation, wherein a size of increased article exhibition area is smaller than the preset size; and
- displaying second information on the target article in size-reduced information exhibition area, wherein amount of information in the second information is smaller than amount of information in the first information;
- wherein increasing the size of the article exhibition area and reducing the size of the information exhibition area in the article exhibition interface in response to the article browsing operation comprises:

determining an interface sliding distance corresponding to the article browsing operation in response to the article browsing operation; and increasing the size of the article exhibition area and reducing the size of the information exhibition area in the article exhibition interface, in response to the interface sliding distance being greater than or equal to a preset distance threshold.

15. The interaction device of article exhibition according to claim 14, wherein a virtual character exhibition area is displayed in the graphical user interface, and the method further comprises:

displaying a game virtual character wearing at least target article in the virtual character exhibition area.

16. The interaction device of article exhibition according to claim 14, wherein a settlement control is displayed in the information exhibition area, and the method further comprises:

in response to a trigger operation on the settlement control, settling the target article.

17. A non-transitory storage medium, wherein the non-transitory storage medium stores a computer program, and the computer program, when executed by a processor, executes an interaction method for article exhibition, comprising:

displaying, on a graphical user interface, an article exhibition area of a preset size in an article exhibition interface, wherein the article exhibition interface is displayed on the graphical user interface, and the article exhibition area is configured to display a plurality of articles;

in response to an article selecting operation input for the article exhibition area, determining a target article selected by the article selecting operation;

reducing a size of the article exhibition area in the article exhibition interface, and displaying an information exhibition area in the article exhibition interface, wherein the information exhibition area is configured to display first information on the target article;

determining, in response to an article browsing operation input for the article exhibition area, a current interface browsing position corresponding to the article browsing operation according to a preset browsing list;

displaying a plurality of articles in the article exhibition area corresponding to the current interface browsing position;

increasing a size of the article exhibition area and reducing a size of the information exhibition area in the article exhibition interface in response to the article browsing operation, wherein a size of increased article exhibition area is smaller than the preset size; and displaying second information on the target article in size-reduced information exhibition area, wherein amount of information in the second information is smaller than amount of information in the first information;

wherein increasing the size of the article exhibition area and reducing the size of the information exhibition area in the article exhibition interface in response to the article browsing operation comprises:

determining an interface sliding distance corresponding to the article browsing operation in response to the article browsing operation; and increasing the size of the article exhibition area and reducing the size of the information exhibition area in the article exhibition interface, in response to the interface sliding distance being greater than or equal to a preset distance threshold.

* * * * *